April 29, 1924.

E. KOLP 1,492,251

GUARD FOR UTENSIL HANDLES

Filed Dec. 11, 1923

Witnesses
Donald Davidson
John H Cooper

Inventor
Elmer Kolp
By W. W. Williamson
Attorney

Patented Apr. 29, 1924.

1,492,251

UNITED STATES PATENT OFFICE.

ELMER KOLP, OF PHILADELPHIA, PENNSYLVANIA.

GUARD FOR UTENSIL HANDLES.

Application filed December 11, 1923. Serial No. 679,928.

*To all whom it may concern:*

Be it known that I, ELMER KOLP, a citizen of the United States, residing at Philadelphia, in the county of Philadelphia and State of Pennsylvania, have invented new and useful Improvements in a Guard for Utensil Handles, of which the following is specification.

My invention relates to new and useful Improvements in a guard for utensil handles, and has for its primary object to provide an exceedingly simple and effective device of this character for the protection of wood, fibre or like handles of utensils when used in connection with open flame heating devices.

Another object of my invention is the provision of a guard that may be readily and quickly placed upon or removed from a handle without the use of fastening devices and without loosening or disassembling any part of the utensil handle.

The advantages of my invention include the simplicity of attachment which obviates the necessity of using any kind of tool thus permitting its placement by the housewife, and the elimination of all fastening devices which often become loosened or accidentally removed.

The above objects are obtained and the advantages accomplished by fashioning a single sheet of suitable metal into sleeve-like formation with the adjacent edges spaced apart and shaped to produce a gradually decreasing mouth leading to a throat which in turn communicates with a socket. The socket is adapted to register with the lower or butt end of the handle of a utensil such as a percolator, tea pot, coffee pot or the like and more particularly with the groove usually found in handles of this class. When so disposed the guard is held in place by the resiliency of the metal from which it is formed and which is accentuated by the formation or shape of the guard.

The utensils to which this device is particularly adapted for use are commonly provided with wood or fibre handles which are readily burnt or charred when the utensils are used over an open flame of a heating device and these handles are practically of standard construction usually including a groove or reduced portion near the lower extremity to give the effect of a knob at the lower end. It is this reduced portion that is engaged by the edges of the guard so that the lower extremity of the handle is completely housed by a part of the guard while another part is disposed beneath the handle arm to effectively prevent a flame from coming in direct contact therewith and deflect the heat therefrom.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawing forming a part of this application, in which:—

In carrying out my invention as herein embodied, 2 represents a utensil, such as a percolator, coffee pot, tea pot or the like, having a wood, fibre or similar handle 3 spaced from the wall of the utensil by arms, the lower one 4 of which is shown. Handles of this character are usually provided with a reduced portion or circumferential groove 5 at their lower or butt ends for ornamental purposes and I take advantage of this formation by utilizing it as the means of attachment for the guard thus obviating the necessity of using fastening devices or loosening or disassembling the parts of the utensils to mount or hold the guard in place.

Figures 5, 6:
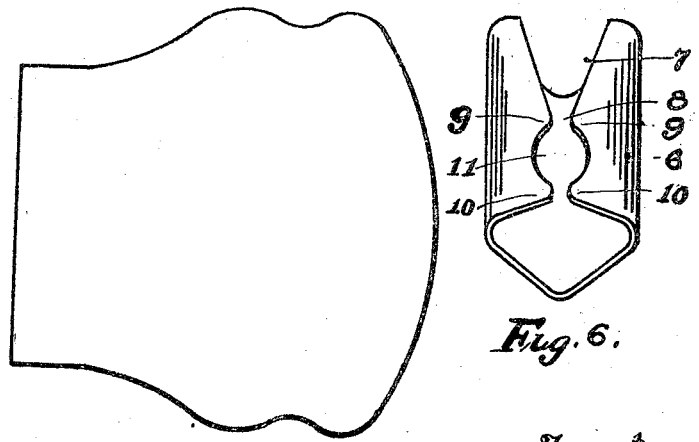
Fig. 5, is a face view of the blank from which the guard is fashioned.
Fig. 6, is an isometric view of a guard slightly differently shaped.

The reference numeral 6 denotes the guard which is formed from a single sheet of suitable metal fashioned from a blank such as shown in Fig. 5, said blank being bent to produce a sleeve-like housing open at both ends. The adjacent edges are spaced apart and shaped to provide a mouth 7 gradually decreasing in width inwardly or toward the throat 8 produced by the projections 9 extending inwardly toward each other from the opposed edges of the guard. Other projections 10 extend inwardly toward each other from the opposed edges of the guard and are spaced from the projections 9 so as to produce a socket 11 in communication with the throat 8.

It is advisable that the metal from which the guard is formed be resilient to a certain extent although the unique shape of said guard will accentuate the resiliency so that when in place it will firmly grip the handle.

Figure 1:
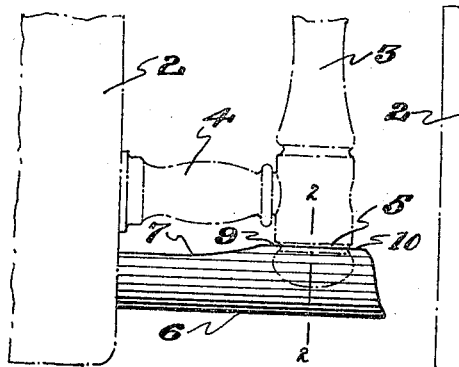
Fig. 1, is a fragmentary side elevation of a utensil illustrated in dotted lines showing the application of my invention to the handle thereof.
Figure 2:
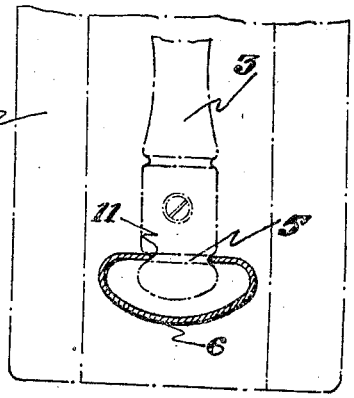
Fig. 2, is a fragmentary rear view of the utensil similarly illustrated with the guard shown in section taken at the line 2—2 of Fig. 1.
Figure 3:
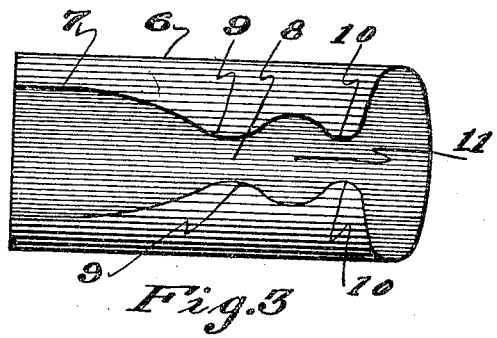
Fig. 3, is an enlarged plan view of the guard per se.
Figure 4:
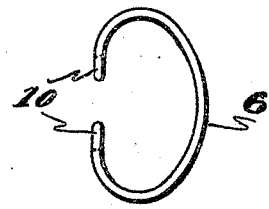
Fig. 4, is an end view thereof.

The guard may be of any desirable cross sectional shape, as for instance, it may be of general elliptical formation, as shown in Figs. 2 and 4, or it may resemble a triangle as in Fig. 6. These shapes are merely suggestive and I do not wish to be limited thereto although it is advisable to utilize some similar formation in order to provide upwardly inclined bottom walls to more readily deflect the heat.

In practice the mouth 7 of the guard is caused to register with the reduced portion or groove 5 of the utensil handle 3 when the knob or butt end of said handle will enter the inner open end of the guard. By moving the guard endwise, inward or toward the utensil the adjacent opposed edges will be further separated until the projections 9 pass the handle when said opposed edges will snap back toward their normal positions and firmly grip the handle within the socket 11. The transverse diameter or width of said socket normally should be less than the diameter of the reduced portion of the handle so as to snugly engage said reduced portion when in place.

When the guard is properly mounted on the handle the lower or butt end thereof will be effectively housed while the arm 4 will be shielded by that part of the guard disposed directly beneath said arm. As will be obvious the guard should be of sufficient length to reach the utensil body wall when the handle is in the socket.

Of course I do not wish to be limited to the exact details of construction as herein shown as these may be varied within the limits of the appended claims without departing from the spirit of my invention.

Having thus fully described my invention, what I claim as new and useful is:—

1. The combination with a utensil including a handle having a reduced portion above its lower extremity, and an arm between it and the utensil, said arm being located above the reduced portion of the handle, of a metal guard of sleeve-like formation with the adjacent opposed edges spaced apart and shaped to provide a mouth gradually decreasing inwardly, a throat, and a socket, said socket adapted to be brought into register with the reduced portion of the handle by passing the mouth and throat over the lower end of the handle, the outer end of said guard enclosing the lower end of the handle and the inner end of said guard being disposed beneath the handle arm.

2. As an article of manufacture, a handle guard comprising a single sheet of resilient metal fashioned to produce a sleeve-like member with the adjacent opposed edges shaped to provide a mouth at one end gradually decreasing in width inwardly, a throat communicating with said mouth and a socket communicating with the throat.

3. As an article of manufacture, a handle guard comprising a single sheet of resilient metal fashioned to produce a sleeve-like member with the adjacent opposed edges shaped to provide a mouth at one end gradually decreasing in width inwardly, and spaced projections extending from both edges to form a socket for the reception of a utensil handle, certain of said projections producing a throat to form a communication between the mouth and socket.

In testimony whereof, I have hereunto affixed my signature.

ELMER KOLP.